US012562902B2

(12) United States Patent
Kwon et al.

(10) Patent No.: US 12,562,902 B2
(45) Date of Patent: Feb. 24, 2026

(54) DYNAMICALLY BINDING NETWORK ENDPOINTS VIA KEY DISTRIBUTION

(71) Applicant: Dell Products L.P., Round Rock, TX (US)

(72) Inventors: Hongsoon Kwon, Porter Ranch, CA (US); Jia Liu, Newmarket (CA); Michael Rash, Mount Airy, MD (US)

(73) Assignee: Dell Products L.P., Round Rock, TX (US)

( * ) Notice: Subject to any disclaimer, the term of this patent is extended or adjusted under 35 U.S.C. 154(b) by 86 days.

(21) Appl. No.: 18/417,519

(22) Filed: Jan. 19, 2024

(65) Prior Publication Data

US 2025/0240162 A1      Jul. 24, 2025

(51) Int. Cl.
*H04L 9/14*               (2006.01)
(52) U.S. Cl.
CPC ....................................... H04L 9/14 (2013.01)
(58) Field of Classification Search
CPC .......................................................... H04L 9/14
See application file for complete search history.

(56) References Cited

U.S. PATENT DOCUMENTS

| | | | | |
|---|---|---|---|---|
| 9,137,270 B2 * | 9/2015 | F | ........................... | H04L 69/162 |
| 2011/0116375 A1 * | 5/2011 | Friedman | ............ | H04L 49/9073 |
| | | | | 370/235 |

| | | | | |
|---|---|---|---|---|
| 2013/0182713 A1 * | 7/2013 | Giacomoni | ........... | H04L 69/162 |
| | | | | 370/400 |
| 2013/0185430 A1 * | 7/2013 | Giacomoni | ........... | H04L 69/162 |
| | | | | 709/225 |
| 2014/0156855 A1 * | 6/2014 | F | ........................... | H04L 69/162 |
| | | | | 709/227 |
| 2014/0156857 A1 * | 6/2014 | F | ........................ | H04L 65/1069 |
| | | | | 709/228 |

* cited by examiner

*Primary Examiner* — Yonas A Bayou
(74) *Attorney, Agent, or Firm* — Fogarty LLP

(57)                ABSTRACT

Systems and methods for dynamically binding network endpoints via key distribution are described. In an illustrative, non-limiting embodiment, an Information Handling System (IHS) may include: a processor; and a memory coupled to the processor, where the memory includes program instructions that cause the IHS to: obtain a network binding map indicating a flat or hierarchical structure of a plurality of endpoints of a network; obtain a respective plurality of cryptographic keys for the plurality of endpoints; and distribute one or more keys of the plurality of cryptographic keys to individual endpoints based, at least in part, on the network binding map. In some embodiments, the program instructions further cause the IHS to: distribute, to individual endpoints, only the one or more keys associated with one or more other endpoints, of plurality of endpoints, to which the respective individual endpoint is bound, according to the network binding map.

17 Claims, 8 Drawing Sheets

HL: HIERARCHICAL LEVEL (E.G., HL1, HL2, ETC.)
EP: NETWORK ENDPOINT (E.G., EP1, EP2, ETC.)

THE ACCESS TO PUBLIC KEY DB IS LIMITED TO CONTROLLER
THE ACCESS TO NETWORK BINDING MAP IS LIMITED TO CONTROLLER

DYNAMICALLY BINDING NETWORK ENDPOINTS VIA KEY DISTRIBUTION

FIELD

This disclosure relates generally to Information Handling Systems (IHSs), and more specifically, to systems and methods for dynamically binding network endpoints via key distribution.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for dynamically binding network endpoints via key distribution are described. In an illustrative, non-limiting embodiment, an Information Handling System (IHS) may include: a processor; and a memory coupled to the processor, where the memory includes program instructions stored thereon that, upon execution by the processor, cause the IHS to: obtain a network binding map indicating a flat or hierarchical structure of a plurality of endpoints of a network; obtain a respective plurality of cryptographic keys for the plurality of endpoints; and distribute one or more keys of the plurality of cryptographic keys to individual endpoints of the plurality of endpoints based, at least in part, on the network binding map.

In some embodiments, to distribute the one or more keys of the plurality of cryptographic keys to the individual endpoints, the program instructions further cause the IHS to: distribute, to a first endpoint of the plurality of endpoints, only the one or more keys associated with a respective one or more other endpoints, of plurality of endpoints, to which the first endpoint is bound, according to the network binding map. In some of these embodiments, the first endpoint is configured to use the distributed one or more keys to authenticate the respective one or more other endpoints. In some embodiments, to distribute the one or more keys of the plurality of cryptographic keys to the individual endpoints, the program instructions further cause the IHS to: distribute, to each endpoint of the plurality of endpoints, only the one or more keys associated with one or more other endpoints, of plurality of endpoints, to which the respective endpoint is bound, according to the network binding map.

In some embodiments, the program instructions further cause the IHS to: cryptographically sign or encrypt the one or more keys of the plurality of cryptographic keys before distribution to the individual endpoints. In some embodiments, the plurality of endpoints store a public key of the IHS, where the individual endpoints are configured to use the stored public key of the IHS to cryptographically decrypt or verify the signature of the cryptographically signed or encrypted one or more keys. In some embodiments, the IHS obtains the respective plurality of cryptographic keys from a public key database. In some of these embodiments, each of the plurality of endpoints create an individual key pair, including an individual public key, where each of the plurality of endpoints provide their individual public key to the public key database.

In some embodiments, the hierarchical structure of the plurality of endpoints of a network is a logical hierarchical structure. In some embodiments, the hierarchical structure of the plurality of endpoints of a network is a physical hierarchical structure.

In some embodiments, the plurality of endpoints include Radio Units (RUs) and Distributed Units (DUs) of a radio access network (RAN). In some of these embodiments, the network binding map includes an RU-DU binding map that at least describes binding among at least some of the RUs and the DUs of the RAN, where to distribute the one or more keys of the plurality of cryptographic keys to the individual endpoints, the program instructions further cause the IHS to: determine, based at least in part on the RU-DU binding map, one or more RUs to which a first DU is connected; distribute one or more respective keys associated with the one or more RUs to the first DU; and distribute a first DU key associated with the first DU to the one or more RUs. In some embodiments, first DU is configured to use the one or more respective keys associated with the one or more RUs to authenticate the one or more RUs, where each of the one or more RUs is configured to use the first DU key to authenticate the first DU.

In another illustrative, non-limiting embodiment, one or more non-transitory computer-readable storage media store program instructions that when executed on or across one or more processors of an Information Handling System (IHS), cause the one or more processors to: obtain a network binding map indicating a hierarchical structure of a plurality of Radio Units (RUs) and Distributed Units (DUs) of a radio access network (RAN); obtain a plurality of cryptographic keys for the respective plurality of RUs and DUs; distribute one or more RU keys, of the plurality of cryptographic keys, corresponding to one or more of the RUs, to a first DU based, at least in part, on the network binding map; and distribute a first DU key corresponding to the first DU to the one or more RUs based, at least in part, on the network binding map. In some embodiments, the one or more RU keys are used by the first DU to authenticate the one or more RUs, where the first DU key is used by each of the one or more RUs to authenticate the first DU.

In another illustrative, non-limiting embodiment, a method includes: obtaining, by a controller of a network, a network binding map indicating a flat or hierarchical structure of a plurality of endpoints of the network; obtaining, by the controller, a plurality of cryptographic keys for the respective plurality of endpoints; and distributing, by the controller, one or more keys of the plurality of cryptographic keys to individual endpoints of the plurality of endpoints based, at least in part, on the network binding map.

US 12,562,902 B2

3

In some embodiments, distributing the one or more keys to the individual endpoints further includes: distributing, to a first endpoint of the plurality of endpoints, only the one or more keys associated with a respective one or more other endpoints, of plurality of endpoints, to which the first endpoint is bound, according to the network binding map. In some embodiments, the first endpoint is configured to use the distributed one or more keys to authenticate the respective one or more other endpoints. In some embodiments, the plurality of endpoints include Radio Units (RUs) and Distributed Units (DUs) of a radio access network (RAN). In some of these embodiments, the network binding map includes an RU-DU binding map that at least describes binding among at least some of the RUs and the DUs of the RAN, where distributing the one or more keys to the individual endpoints further includes: determining, by the controller and based at least in part on the RU-DU binding map, one or more RUs to which a first DU is connected; distributing, by the controller, one or more respective keys associated with the one or more RUs to the first DU; and distributing, by the controller, a first DU key associated with the first DU to the one or more RUs.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may consist of various combinations of a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include components such as Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
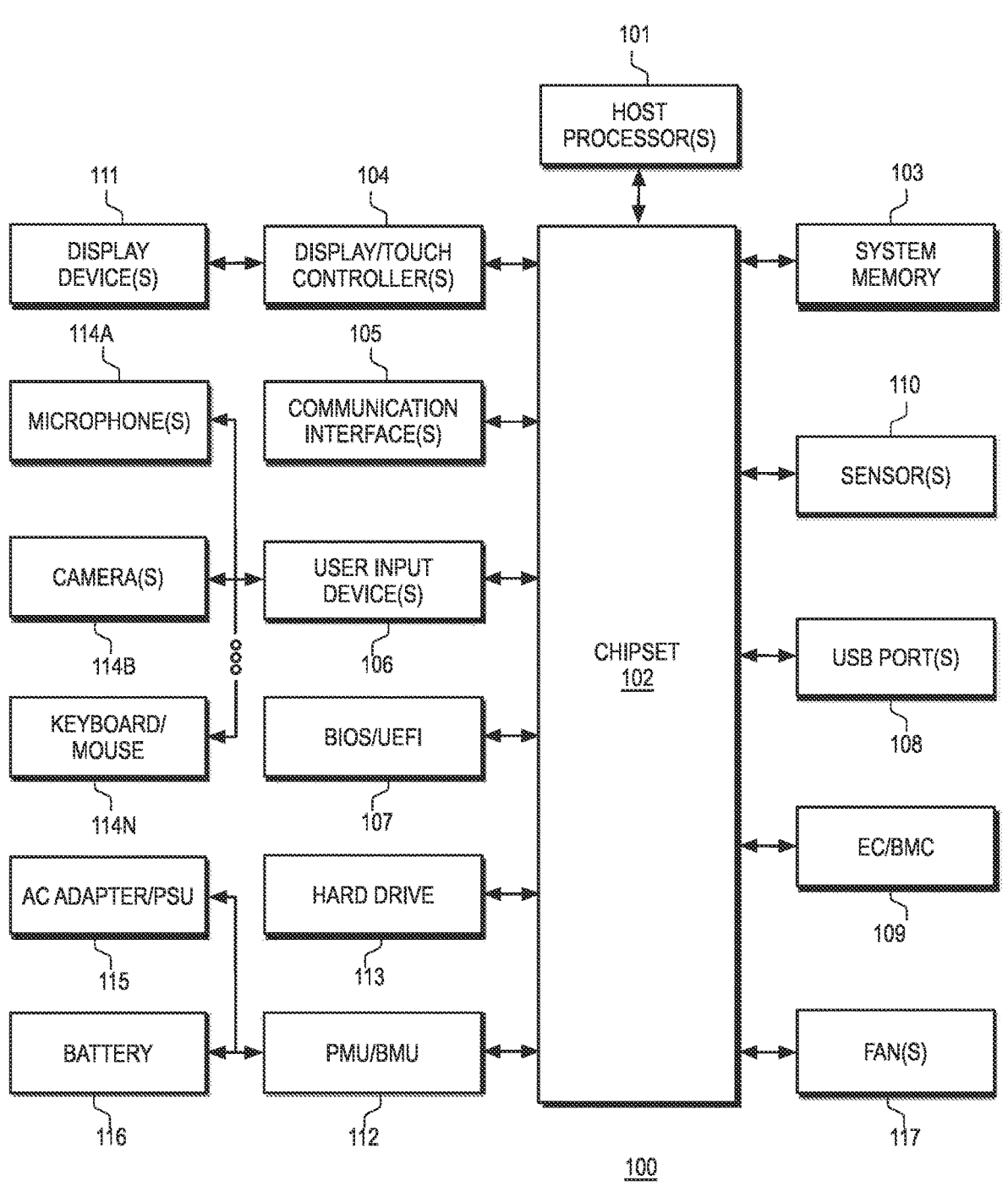
FIG. 1 is a diagram illustrating examples of hardware components of an Information Handling System (IHS), according to some embodiments.

FIG. 1 is a block diagram of hardware components of IHS 100, which may be used to implement systems and methods for dynamically binding network endpoints via key distribution.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.). In some embodiments, the host processor(s) 101 can include memory built into the host processor(s) from which, for example, program instructions can be executed.

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s)

111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. For example, IHS 100 may include security processors (e.g., Trusted Platform Module (TPM)), GPUs, and/or AI accelerators.

Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
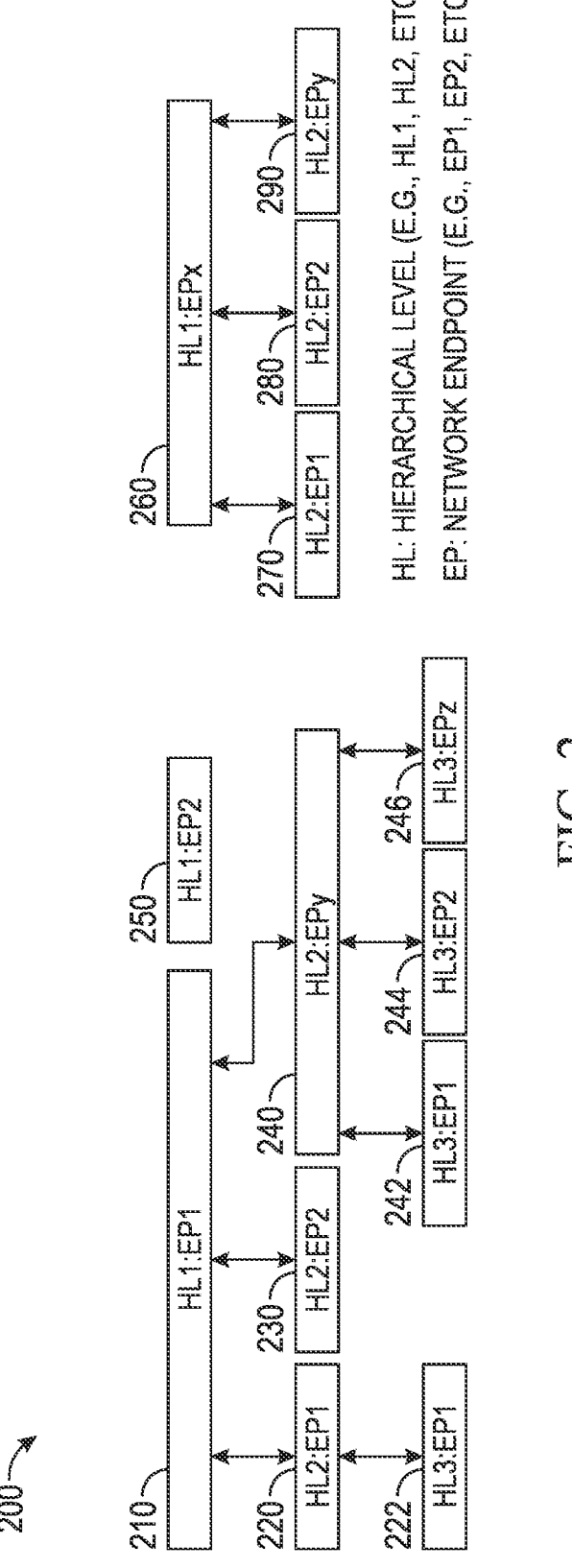
FIG. 2 is a structural diagram depicting an example of a network with a hierarchical network topology for dynamically binding network endpoints via key distribution, according to some embodiments.

Some embodiments of the present disclosure pertain to dynamically binding network endpoints ("EPs") as the life-cycle of a given network evolves. FIG. 2 is a structural diagram depicting an example of a network 200 with a hierarchical network topology for dynamically binding network endpoints via key distribution, according to some embodiments. In some embodiments, the individual endpoints ("EPs") of the network 200 may be instantiated, at least in part, through the execution of program instructions stored in system memory 103 and executed by host processor(s) 101 of IHS 100.

A network's hierarchical Levels ("HLs") can be physical, or logical, or a hybrid (i.e., combination thereof). FIG. 2 depicts a hierarchical network topology where a network endpoint ("EP") at Hierarchical Level n ("HL(n)") is dynamically bound to certain EP/EPs at an upper HL n−1 ("HL(n−1)") and to certain EP/EPs at a lower HL n+1 ("HL(n+1)").

For example, the endpoint 1 at hierarchical level 1 210 ('HL1:EP1' 210) is bound to three endpoints at a lower hierarchical level: 'HL2:EP1' 220, 'HL2:EP2' 230, and 'HL2:EPy' 240. As another example, the endpoint 2 at hierarchical level 1 250 ('HL1:EP2' 210) is not bound to any other endpoints. As another example, three hierarchical level 3 endpoints are bound to higher level 'HL2:EPy' 240: 'HL3:EP1' 242, 'HL3:EP2' 244, and 'HL3:EPz' 246. As another example, the endpoint 1 at hierarchical level 3 222 ('HL3:EP1' 222) is bound to endpoint 1 at hierarchical level 2 220 ('HL2:EP1' 220). As another example, 'HL1:EPx' 260 is bound to the following endpoints at lower hierarchical level 2: 'HL2:EP1' 270, 'HL2:EP2' 280, 'HL2:EPy' 290.

The network 200 of FIG. 2 can perform dynamic binding of endpoints. Examples of dynamic binding can be as follows: (1) A given EP physically breaks down and needs to be replaced with a new EP. (2) An 'HL3:EP1' 222 bound to 'HL2:EP1' 220 at one point needs to be re-configured to bind to another EP at HL2 (e.g., 'HL2:EP2' 230 or 'HL2:EPy' 240). (3) 'HL1:EPx' 260 requires additional connectivity from HL2, requiring the addition of EPs at HL2 under 'HL1:EPx' 260.

However a number of problems can arise with dynamic binding of endpoints. Firstly, in a network where an EP at a given HL (e.g., HL(n)) is to bind to an EP at an upper HL (e.g., HL(n−1)) and EPs at a lower HL (e.g., HL(n+1), as per a network binding map, then an EP at HL(n) needs to be told of EPs at HL(n−1), and EPs at HL(n+1), that it is allowed to connect to. Such an EP at HL(n) should save the information at its local binding map, in some embodiments.

Secondly, such an EP at HL(n) should connect only to EPs on its local binding map, and should reject connection requests from EPs not on its local binding map. Thirdly, an EP at HL(n) should authenticate its counterpart on a given connection, requiring that public key (e.g., ssh keys, X.509 certificates, etc.) of its counterpart EP (e.g., at HL(n−1) or HL(n+1)) to be delivered to the EP at HL(n). Fourthly, any binding map may not be available to an EP at HL(n) at EP manufacturing time, and may not be available even ahead of deployment. In addition, any binding map may change during the lifetime of the EPs. Fifthly, manually distributing and/or updating binding map and public keys may become untenable as the number of EPs increases.

Lastly, an implementation may accept an initial connection from another party (e.g., 'HL2:EP1' 230 accepting connection from 'HL3:EP1' 242) without any authentication and/or exchange of public keys to be used for future authentication. Such initial connection of such an implementation, however, is open to exploitation, and allows for infiltration of attacker-controlled public keys compromising future communications.

Figure 3:
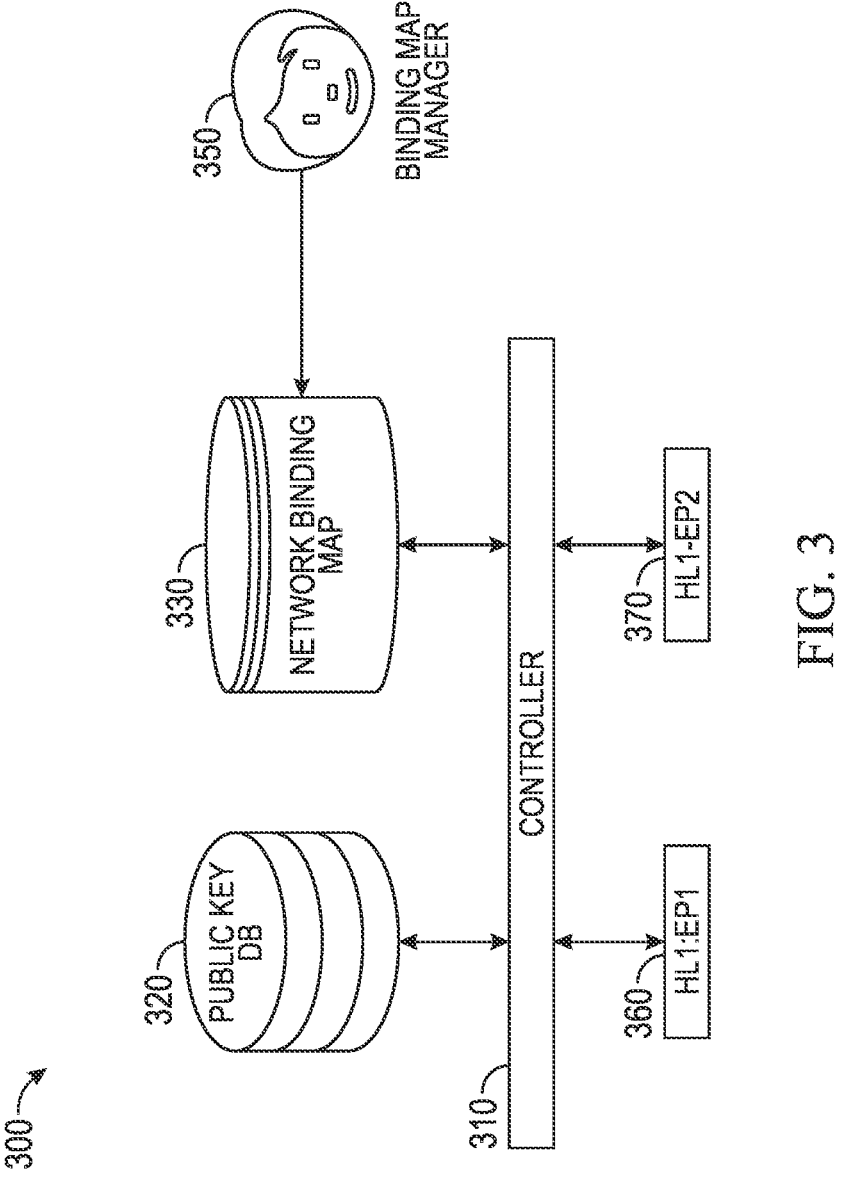
FIG. 3 is a structural diagram depicting an example of a network with a hierarchical network topology for dynamically binding network endpoints via key distribution, including a controller, a public key DB, and a network binding map, according to some embodiments.

Some embodiments of the present disclosure solve these and other problems by using a controller, a public key database ("DB"), and/or a network binding map. FIG. 3 is a structural diagram depicting an example of a network 300 with a hierarchical network topology for dynamically binding network endpoints via key distribution, including a controller 310, a Public Key DB 320, and a network binding map 330, according to some embodiments. In some embodiments, the individual endpoints ("EPs"), the controller, the DB, and/or the network binding map of the network 300 may be instantiated, at least in part, through the execution of program instructions stored in system memory 103 and executed by host processor(s) 101 of IHS 100, and/or through the execution of program instructions stored within its own memory.

In FIG. 3, the controller's public key is known a priori and is installed to network endpoints (e.g., 'HL1:EP1' 360 and 'HL1:EP2' 370) by a system manufacturer, or any one or more entities that can inject such a key at manufacturing time or before deployment. The Public Key DB 320 maintains public keys of EPs allowed in the network. The public keys can be a blob of data representing a public portion of asymmetric key pair expressed in some forms, in some embodiments (e.g., just the public portion of the key pair, X.509 certificate, etc.). The Network Binding Map 330 can indicate binding among the EPs. The network binding map 330 can be configured by a binding map manager 350, for example. For each EP at Hierarchical Level n (HL(n)), the map can indicate the EPs in the upper HL (HL(n−1)) the EP is allowed to connect and/or bind to, and EPs in the lower HL (HL(n+1)) that the EP is allowed to connect and/or bind to, for example.

The controller 310 can automatically distribute public keys of EPs to their counterparts according to Network Binding Map 330 in a secure manner. For example, the controller 310 can optionally sign public keys with its private key, and/or encrypt the public keys via an encryption key derived via some other means, and distribute the signed and/or encrypted public keys to EPs. In addition, the controller 310 can optionally encrypt public keys to be distributed with the public key of a given endpoint and distribute encrypted public keys to the endpoint. For example, controller 310 can encrypt the public keys to be distributed to 'HL1:EP1' 360 via the public key of 'HL1:EP1' 360, which is available in the Public Key DB 320. The encryption key can be derived via other means.

In addition, the controller 310 can optionally distribute endpoint information associated with distributed keys, according to some embodiments. This information may include the name, IP address and others pertaining to EPs that exist in the network binding map. This information can, in some embodiments, simplify the process of authenticating counterpart EPs. For example, an authenticating EP would know the identity of the counterpart EP and perform the authentication based on the public key associated with the counterpart EP instead of searching through all public keys in the local database. In other embodiments, the controller 310 can optionally distribute all binding information and associated public keys, to all endpoints. In these embodiments, all EPs can share the same binding information of the entire network.

The EPs (e.g., 'HL1:EP1' 360 and 'HL1:EP2' 370) can verify the signature of the signed public keys with the known controller's public key. The EPs can also decrypt the encrypted public keys, if necessary. These procedures can provide an additional layer of security for verifying by EPs, since the public keys blobs are from Controller 310. The controller 310 can, in some respects, play the role of Certificate Authority to some extent. The controller 310 can also authenticate each EP based on the EP's public key from Public Key DB 320. An EP authenticates the controller 310 based on controller's public key installed ahead of deployment (e.g., at manufacturing). In some embodiments, the controller's public key may change in its life cycle, and updating the controller's public key and distributing the updated keys to EPs may take place in some secure manner.

Some embodiments of dynamically binding network endpoints via key distribution, such as discussed above, provides advantages to other ways of binding network endpoints. These embodiments can overcome the disadvantages of these other ways. A first other way could be where a network operator sends its network binding map to the IHS manufacturer, and then the IHS manufacturer configures each EP according to the map. This first other way, however, adds complexities to manufacturing process and the process is burdened with securing the map. If, however, the network binding map is not available ahead of deployment (e.g., at manufacturing time), then a second other way could be to wait until a later time to configure public keys, possibly until deployment. In this second other way, however, the manual nature of the process will incur deployment delay and the manual process comes with security risks. A third other way could occur if the binding map changes. If the binding map does change, then EPs would be taken out of service, brought to service center, reconfigured and brought back into the network. In this third other way, however, it will be difficult to administer for a large number of EPs. In addition, EPs at hard-to-reach locations will incur additional complexities with this third other way.

Therefore, some embodiments of the systems and methods for dynamically binding network endpoints via key distribution provide advantages to other ways of binding network endpoints. First, with some embodiments of dynamically binding network endpoints via key distribution, the operational binding among endpoints do not necessarily need to be known until deployment, and trust relations among EPs do not need to exist beforehand. Second, the operational binding may change. Some embodiments provide these advantages through a single trust anchor for distributing public keys of EPs, as per the disclosed Network Binding Map. Third, some embodiments of dynamically binding network endpoints via key distribution automatically distribute public keys as per the operational binding map. In some embodiments, the controller optionally signs public keys (e.g., a blob of data representing the public portion of the key pair), and/or optionally encrypts the public keys, and distributes the signed and/or encrypted public keys. Fourth, some embodiments of dynamically binding network endpoints via key distribution enforce the operational binding map to ensure that non-allowed connections are denied. Fifth, some embodiments of dynamically binding network endpoints via key distribution allow a surplus of EPs to be installed at the network, which can then be brought into operation as needed at later time.

Figure 4:
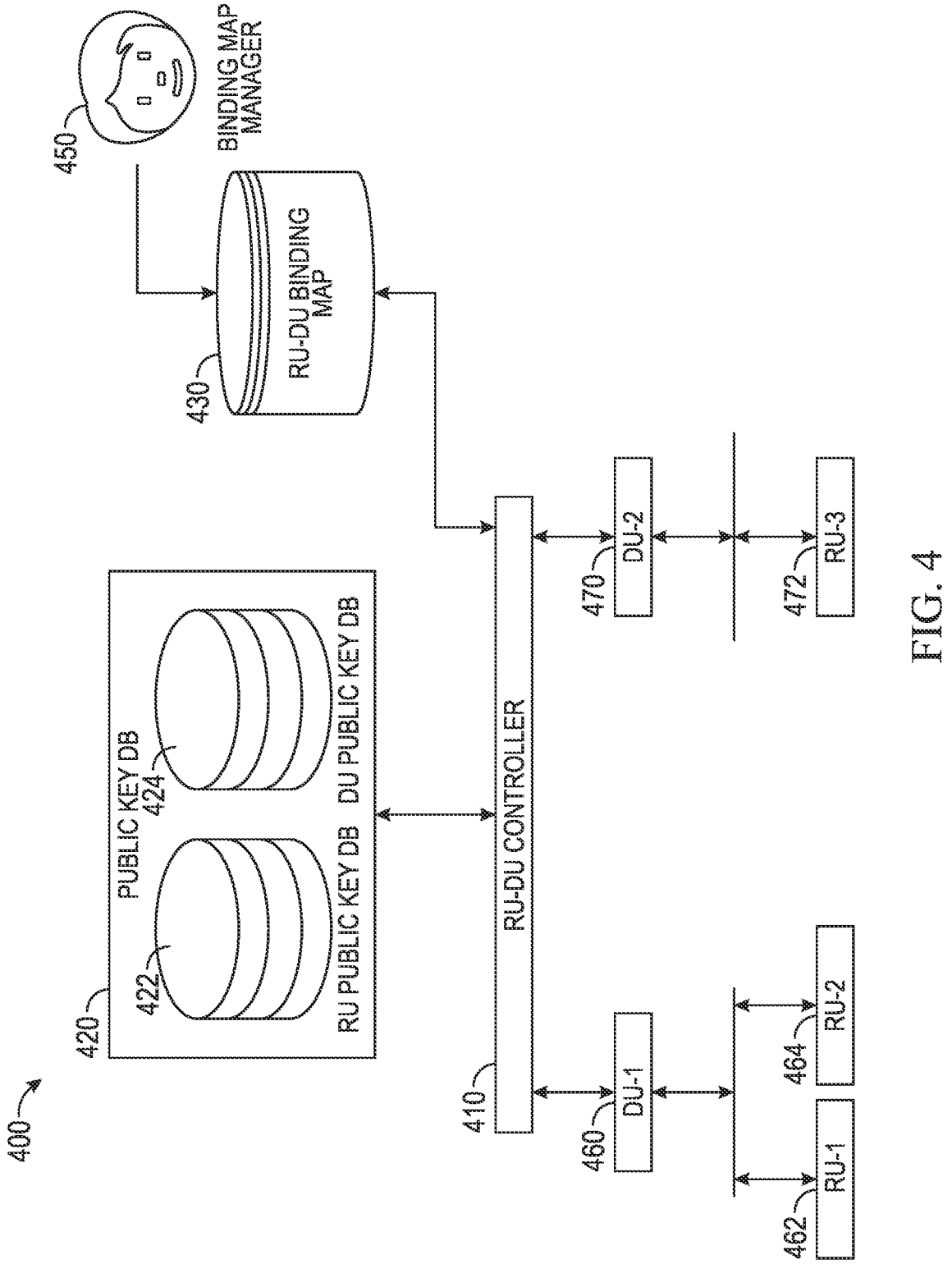
FIG. 4 is a structural diagram depicting an example application to an open radio access network ("O-RAN") with a hierarchical network topology for dynamically binding network endpoints via key distribution, according to some embodiments.

FIG. 4 is a structural diagram that describes the application of at least some embodiments to an Open Radio Access Network ("O-RAN") 400 with a hierarchical network topology for dynamically binding network endpoints via key distribution. In some embodiments, the individual endpoints, the controller, the DB, and/or the network binding map of the network 400 may be instantiated, at least in part, through the execution of program instructions stored in system memory 103 and executed by host processor(s) 101 of IHS 100.

An Open Radio Access Network ("O-RAN") is a non-proprietary version of the Radio Access Network ("RAN") system that allows interoperation between cellular network equipment provided by different vendors. RAN traditionally has been a proprietary (closed) segment of the network. Currently, it is the last remaining portion of the network that is predominantly proprietary. The future goal for O-RAN is for any hardware and software in the cellular network to interoperate both seamlessly and securely regardless of its originating vendor.

A radio access network ("RAN") is part of a mobile telecommunication system implementing a radio access technology ("RAT"). A RAN is a major component of a wireless telecommunications system that connects individual devices to other parts of a network through a radio link. Conceptually, it resides between a device such as a mobile phone, a computer, or any remotely controlled machine (collectively, user equipment), and provides connection with a core network ("CN"). The RAN can link user equipment over a fiber or wireless Backhaul connection. Depending on the standard, mobile phones and other wireless connected devices are varyingly known as user equipment ("UE"), terminal equipment, mobile stations ("MSs"), etc.

The RAN, which is sometimes also called the access network, includes the radio element of the cellular network. A cellular network is made up of land areas called cells. A cell is served by at least one radio transceiver. The RAN is the final link between the network and the phone in the cell. It is the visible piece and includes the antennae seen on towers, on top of buildings, or in stadia, plus the base stations. When a user makes a call or connects to a remote server (e.g., to watch an Internet video), the antenna transmits and receives signals to and from our phones or other hand-held devices. The signal is then digitalized in the RAN base station and connected to the network. RANs have evolved from the first generation (1G) to the fifth generation (5G) of cellular networking.

The CN has many functions. It provides access controls ensuring users are authenticated for the services they are using, it routes telephone calls over the public switched telephone network, it enables operators to charge for calls and data use, and it connects users to the rest of the world via the Internet. It also controls the network by making handovers happen as a user moves from coverage provided by one RAN tower to the next.

In an O-RAN environment, the RAN is disaggregated into three main building blocks: (1) the Radio Unit ("RU"); (2) the Distributed Unit ("DU"); and (3) the Centralized Unit ("CU"). The RU is where the radio frequency signals are transmitted, received, amplified, and digitized. The RU is located near or integrated into, the antenna and/or the cell tower. The DU and CU are the computation parts of the base station, sending the digitalized radio signal into the network. The DU is physically located at or near the RU whereas the CU can be located nearer the core network ("CN").

The key concept of Open RAN is "opening" the protocols and interfaces between these various building blocks (radios, hardware, and software) in the RAN. The O-RAN Alliance has defined different interfaces within the RAN including for example Fronthaul between the Radio Unit and the Distributed Unit. Additional information about O-RAN is provided by the O-RAN ALLIANCE e.V. at their website: https://www.o-ran.org/

Referring back to FIG. 4, the O-RAN 400, with the addition of the systems and methods introduced in some embodiments, includes an RU-DU controller 410, an RU-DU binding map 430, and a Public Key DB 420. The Public Key DB 420 includes an RU Public Key DB 422, and a DU Public Key DB 424. The RU-DU Controller 410 is included by some embodiments of the systems and methods for dynamically binding network endpoints via key distribution. The RU-DU Controller 410 has access to the RUs and DUs in the network. The public key of the RU-DU Controller 410 can be provided to RU and DU vendors, who in turn can install the public key on the network elements.

In some embodiments, the RU-DU Controller 410 can have access to the RU Public Key DB 422 and the DU Public Key DB 424. The RU Public Key DB 422 and the DU Public Key DB 424 can maintain public keys of some or all of the RUs and DUs in the network, respectively. The RU-DU Controller 410 can also have access to the RU-DU Binding Map 430. The RU-DU Binding Map 430 can contain the up-to-date DU and RU connection relations for the O-RAN 400. For example, in FIG. 4, DU-1 460 connects to RU-1 462 and RU-2 464, while DU-2 470 connects to RU-3 472. The RU-DU Binding Map 430 can be created and/or maintained by a binding map manager 450.

When a Network Element (e.g., a DU or RU) is deployed, it can first mutually authenticate with the RU-DU Controller 410. The RU-DU Controller 410 can then distribute (signed/encrypted) public keys of the Network Element's counterpart based on the RU-DU Binding Map 430. During the operation, if there is any update in the RU-DU Binding Map 430, (e.g., a DU is swapped), the RU-DU Controller 410 can distribute the public keys of the new DU and the RU to their counterparts. Some further details are illustrated in the later figures.

These embodiments of dynamically binding network endpoints via key distribution, such as depicted by the example in FIG. 4 therefore, enforce that RUs (e.g., 462, 464, 472) and DUs (e.g., 460 & 470) receive public keys of their counterparts only from RU-DU Controller 410, and that RUs and DUs limit their connections to those indicated via public keys from RU-DU Controller 410. In the case of signed/encrypted public keys, an individual DU and/or RU can verify the signature with RU-DU Controller's public key, which it already possesses.

Figure 5:
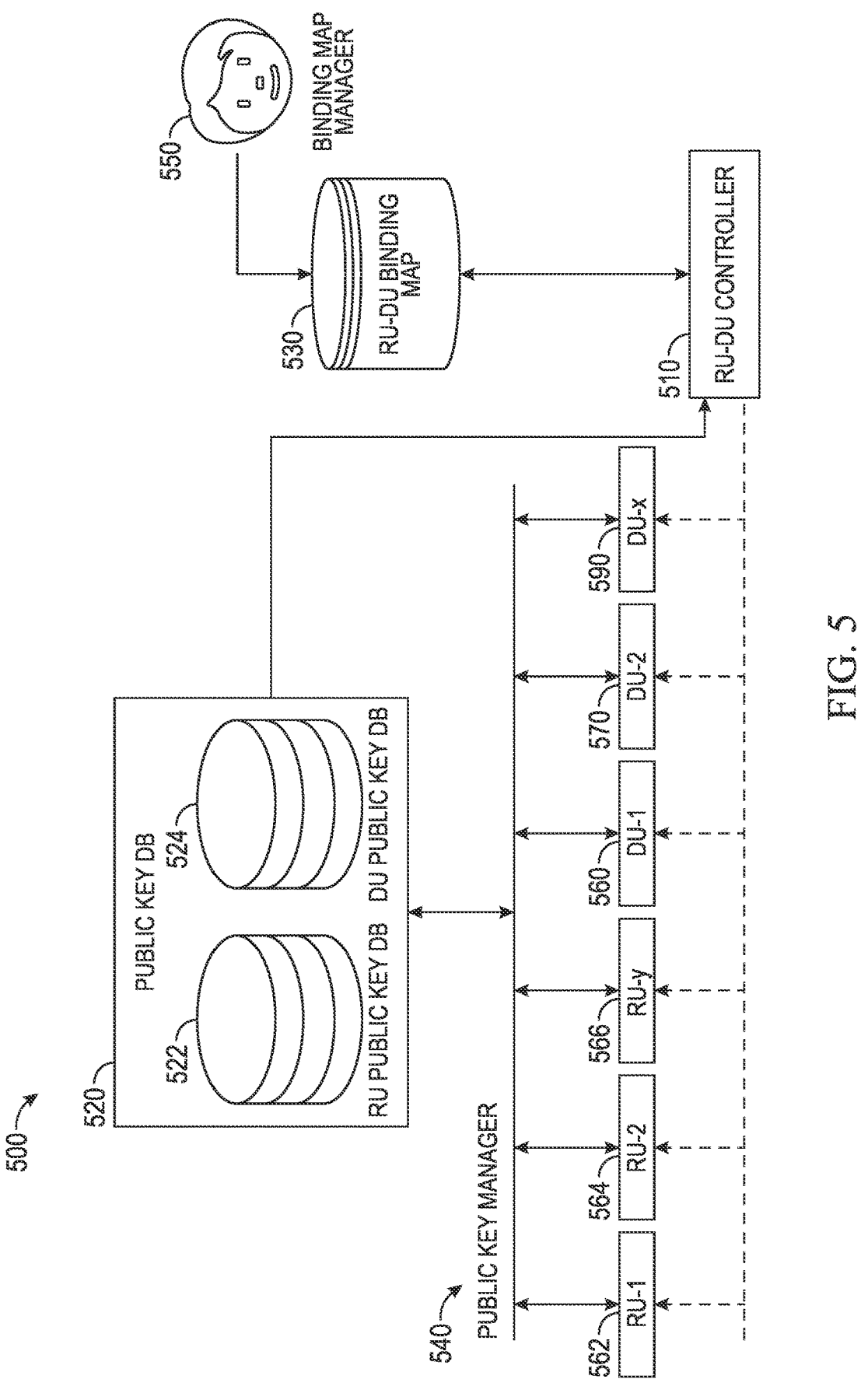
FIG. 5 is a structural diagram depicting an example of provisioning public keys for a non-operational state of an O-RAN with a hierarchical network topology, according to some embodiments.

FIG. 5 is a structural diagram depicting an example of provisioning public keys at a non-operational state in an open radio access network ("O-RAN") 500 with a hierarchical network topology, according to some embodiments. In some embodiments, the individual endpoints, the controller, the DB, and/or the network binding map of the network 500 may be instantiated, at least in part, through the execution of program instructions stored in system memory 103 and executed by host processor(s) 101 of IHS 100.

Referring to FIG. 5, the key pair for the RU-DU Controller 510 can first be created. Some examples of the types of the key pairs can be an X.509 certificate obtained via a Certificate Authority, or an ECDSA, or post-quantum cryptographic key pair, generated locally, for example. The public portion of the key pair of RU-DU Controller 510 can be provisioned to RUs and DUs of the O-RAN 500. For example, the public portion of the key pair of RU-DU Controller 510 can be provisioned to RU-1 562, RU-2 564, RU-y 566, DU-1 560, DU-2 570, and DU-x 590.

The RUs and DUs can create their own key pairs, including their own public keys, such as by a same or different method as the key pair for the RU-DU Controller 510 is created. The RUs (562, 564, 566) and DUs (560, 570, 590) can then send the public portion of their public key pair to Public Key DB 520, such as via a Public Key Manager 540. Keys for RUs and DUs may change in their respective life cycles. Such life cycle events may take place in a secure manner.

Before or after these events, the Binding Map Manager 550 can construct an RU-DU Binding Map 530 to indicate the binding of RUs and DUs. The RU-DU Binding Map 530 can indicate which RUs are allowed to connect to which DUs, for example.

When RUs and DUs are placed into an operating network, the RU-DU Controller 510 can distribute public keys according to RU-DU Binding Map 530. For an example, if RU-1 562 and RU-2 564 are to bind with DU-1 560, the RU-DU Controller 510 can distribute public keys of RU-1

562 and RU-2 564 to DU-1 560, and can also distribute one or more public keys of DU-1 560 to RU-1 562 and RU-2 564. If, in some embodiments, the RU-DU Controller 510 signs/encrypts public keys, then the signed/encrypted public keys can be distributed.

Figure 6:
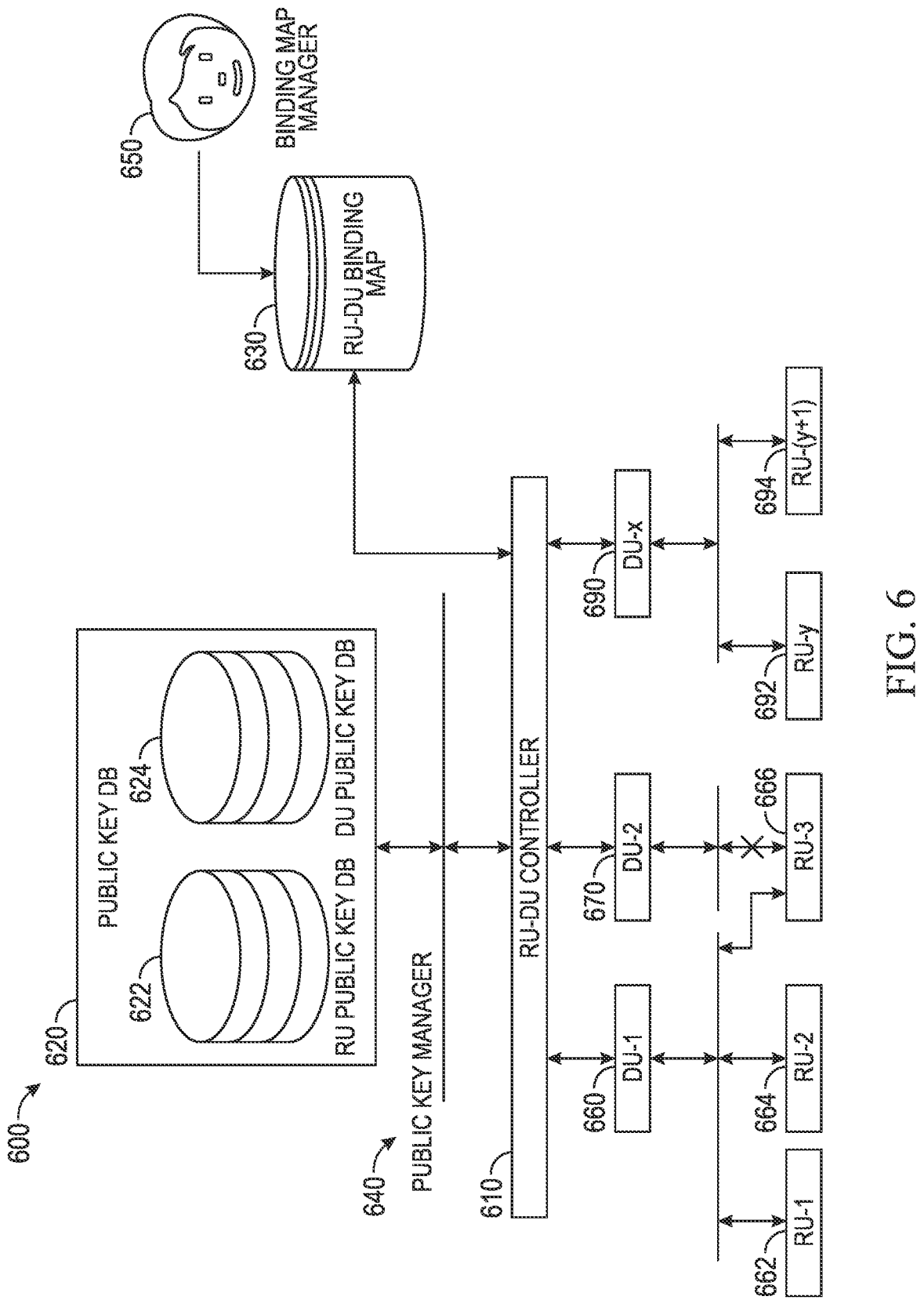
FIG. 6 is a structural diagram depicting an example of provisioning public keys for an operational state of an O-RAN with a hierarchical network topology, according to some embodiments.

FIG. 6 is a structural diagram depicting an example of provisioning public keys in an open radio access network ("O-RAN") 600 with a hierarchical network topology that is operating in an operational state, according to some embodiments. In some embodiments, the individual endpoints, the controller, the DB, and/or the network binding map of the network 600 may be instantiated, at least in part, through the execution of program instructions stored in system memory 103 and executed by host processor(s) 101 of IHS 100.

In a hierarchical model of the O-RAN 600 of FIG. 6, the RU-DU Controller 610 talks to RUs (662, 664, 666, 692, 694) via DUs (660, 670, 690). FIG. 6 depicts an O-RAN of FIG. 4 after changes and/or modifications have been made to the O-RAN 400 of FIG. 4. The O-RAN 400 of FIG. 4, as applied to the components of FIG. 6, leads to an RU-DU Binding Map where DU-1 660 connects to RU-1 662 and RU-2 664, while DU-2 670 connects to RU-3 666. This is depicted by the following RU-DU Binding Map: (DU-1, (RU-1, RU-2)), (DU-2, RU-3). Assume that this is the starting state of the O-RAN 600 of FIG. 6.

Starting from the starting state mentioned above (which is similar to FIG. 4), FIG. 6 firstly depicts an O-RAN 600 after the introduction of new network elements. Assume DU-x 690 and RU-y 692 and RU-(y+1) 694 are introduced to the network via following an RU-DU Binding Map: (DU-x, (RU-y, RU-(y+1)). In such a scenario, the Binding Map Manager 650 can update the RU-DU Binding Map 630. Then, the RU-DU Controller 610 can learn about the update to the map, in some embodiments, and distribute the public keys of RU-y 692 and RU-(y+1) 694 to DU-x 690. In some embodiments, the RU-DU Controller can create a tunnel to RU-y 692 via DU-x 690, and then distribute the public key of DU-x 690 to RU-y 692. Similarly, the RU-DU Controller 610 can create a tunnel to RU-(y+1) 694 via DU-x 690, and can distribute the public key of DU-x 690 to RU-(y+1) 694. If, in some embodiments, the RU-DU Controller 610 signs/encrypts the public keys, then it can distribute such signed/encrypted public keys.

In addition, starting from the starting state mentioned above (which is similar to FIG. 4), FIG. 6 secondly depicts an O-RAN 600 after a modification of the RU-DU Binding. Assume, for example, that RU-3 666 is removed from the DU-2 670 connection, and is instead assigned to DU-1 660. In such a scenario, the Binding Map Manager 650 can update the RU-DU Binding Map 630. Then, the RU-DU Controller 610 can learn about the update to the map. The RU-DU Controller 610 can send to DU-2 670 the updated map. DU-2 670 can then instruct RU-3 666 to add DU-1's public key, and to remove DU-2's public key. DU-2 670 can then remove RU-3's public key from its own local map. DU-2 670 and RU-3 666 can disconnect. The RU-DU Controller 610 can in turn send to DU-1 660 the updated map for DU-1. DU-1 660 and RU-3 666 can then establish a connection, according to some embodiments.

Figure 7:
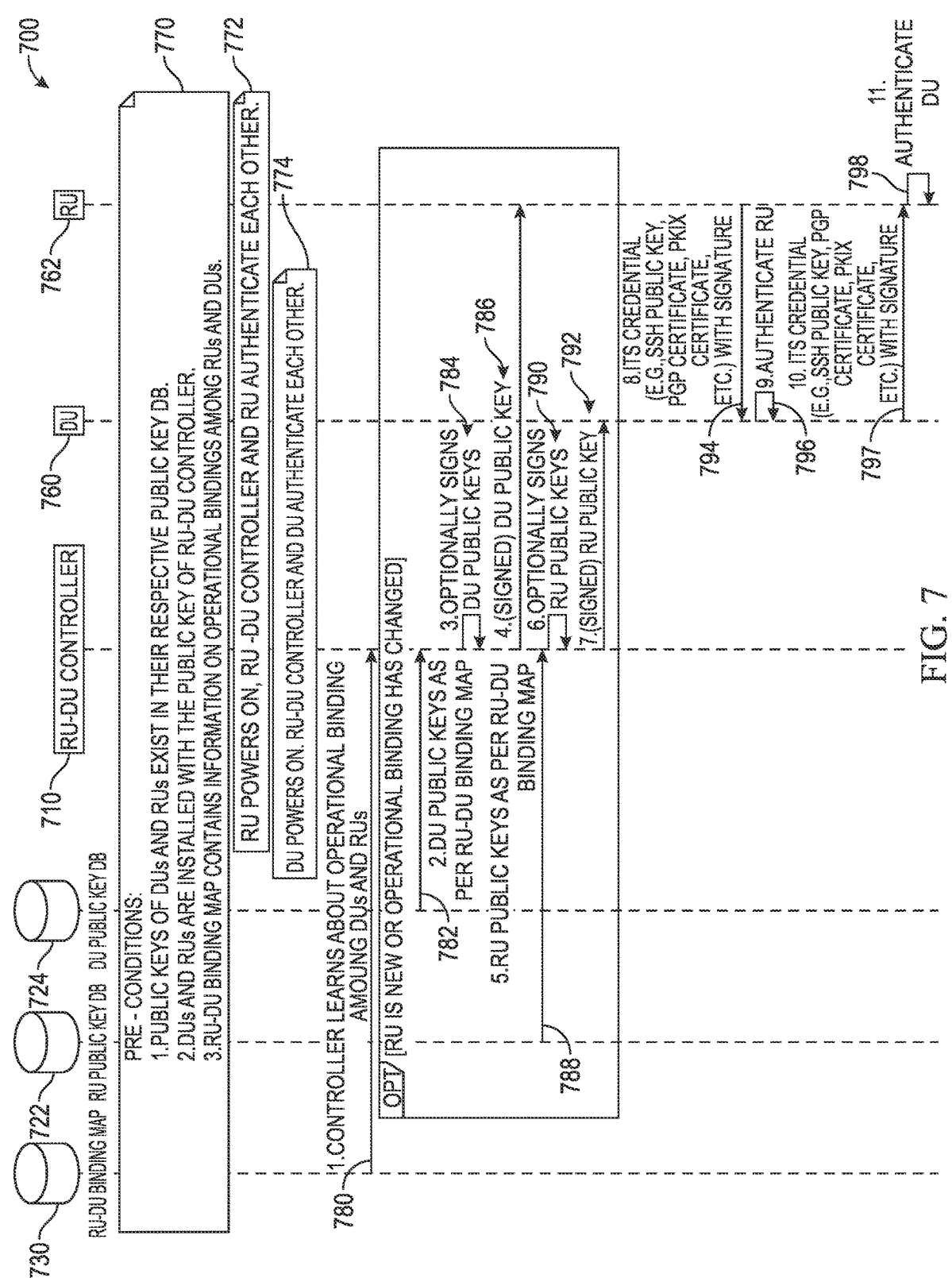
FIG. 7 is a flowchart illustrating an example workflow for distributing public keys according to a method for dynamically binding network endpoints via key distribution, according to some embodiments.

FIG. 7 is a flowchart illustrating an example workflow 700 for distributing public keys according to a method for dynamically binding network endpoints via key distribution, according to some embodiments. In some embodiments, the workflow 700 may be performed, at least in part, by operation of systems 400, 500, and/or 600.

FIG. 7 depicts an RU-DU binding map 730, an RU Public Key DB 722, an DU Public Key DB 724, an RU-DU controller 710, an example DU 760 of an O-RAN, and an example RU 762 of an O-RAN. FIG. 7 first lists a number of pre-conditions 770 for the workflow's operation. As a first pre-condition, public keys of the RUs and DUs should exist in their respective Public Key DBs (722, 724). As a second pre-condition, DUs and RUs should be installed with the public key of the RU-DU controller 710. As a third pre-condition, the RU-DU binding map 730 should contain information of the operational bindings among RUs and DUs.

After the preconditions are established, whenever an RU 762 powers on, the RU-DU controller 710 and the RU 762 authenticate each other 772. Similarly, whenever a DU 760 powers on, the RU-DU controller 710 and the DU 760 authenticate each other 774. Then, as a first depicted step 780 of the workflow, the RU-DU controller 710 learns about the operational binding among DUs and RUs from the RU-DU binding map 730.

If an RU is new, or an operational binding has changed, then the steps 782-792 in the box labelled "OPT" of the flowchart can be executed. As a first depicted optional step 782 ($2^{nd}$ depicted overall step of the flowchart 700), the RU-DU controller 710 can learn about the DU public keys (as per the RU-DU binding map 730) from the DU Public Key DB 724. As a second optional step 784, the RU-DU controller 710 can optionally sign the DU public keys. As a third optional step 786, the RU-DU controller 710 can send the appropriate DU public key(s) (of DU 760) (which is optionally signed/encrypted) to RU 762.

The RU-DU controller 710 can perform similar actions for the RU public keys. As a fourth depicted optional step 788 ($5^{th}$ depicted overall step of the flowchart 700), the RU-DU controller 710 can learn about the RU public keys (as per the RU-DU binding map 730) from the RU Public Key DB 722. As a $6^{th}$ overall step 790, the RU-DU controller 710 can optionally sign the RU public keys. As a $7^{th}$ overall step 792, the RU-DU controller 710 can send the appropriate RU public key(s) (of RU 762) (which is optionally signed/encrypted) to DU 760.

Once the DU 760 and RU 762 have obtained the respective public keys of each other, they can then authenticate each other, per steps 794-798 of the workflow 700. As an $8^{th}$ overall step 794, the RU 762 can provide the DU 760 its credential (e.g., an Secure Shell Protocol ("SSH") public key, a Pretty Good Privacy ("PGP") certificate, a Public key Infrastructure ("PKIX") certificate, etc.) with a signature. The DU 760 can then authenticate 796 the RU using the obtained RU credential from the RU 762, and the RU public key obtained from the RU-DU controller 710. As a $10^{th}$ overall step 797, the DU 760 can provide the RU 762 its credential (e.g., an SSH public key, a PGP certificate, a PKIX certificate, etc.) with a signature. As an $11^{th}$ overall step 798, the RU 762 can then authenticate 798 the DU using the obtained DU credential from the DU 760, and the DU public key obtained from the RU-DU controller 710.

Figure 8:
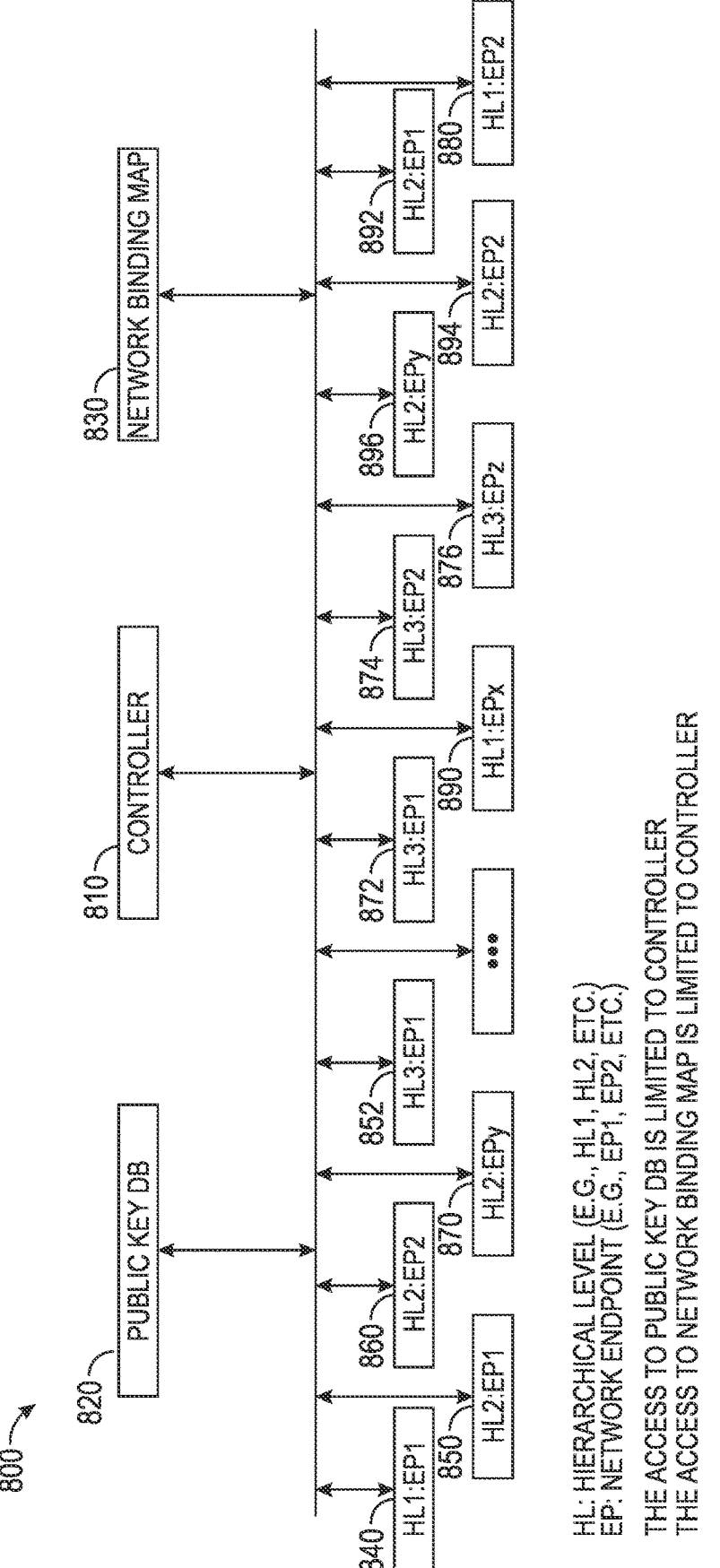
FIG. 8 is a structural diagram depicting an example of a flat physical network with a logical hierarchical network topology for dynamically binding network endpoints via key distribution, according to some embodiments.

FIG. 8 is a structural diagram depicting an example of a flat physical network 800 with a logical hierarchical network topology for dynamically binding network endpoints via key distribution, according to some embodiments. As discussed with regard to FIG. 2, the network hierarchy can be physical, logical, or combination thereof. The diagram in FIG. 2 can be viewed as physically constructed hierarchical levels (HLs). However, the hierarchical levels (HLs) can also be built in a physically flat network. FIG. 8 depicts a physically flat network 800 that has a logical network hierarchy with HLs as depicted structurally in FIG. 2. FIG. 8 also includes a controller 810, a Public Key DB 820, and a network binding map 830 not depicted in FIG. 2. In FIG. 8, per some embodiments of the systems and methods for dynamically binding network endpoints via key distribution, the access to the Public Key DB 820 can be limited to the controller 810. In addition, the access to the network binding map 830 can also be limited to the controller 810, according to some embodiments.

FIG. 8 depicts a logical hierarchical network topology where a network endpoint ("EP") at Hierarchical Level n ("HL(n)") is dynamically bound to certain EP/EPs at a logical upper HL n−1 ("HL(n−1)") and to certain EP/EPs at a logical lower HL n+1 ("HL(n+1)"). For example, the endpoint 1 at hierarchical level 1 840 ('HL1:EP1' 840) is logically bound to three endpoints at a lower hierarchical level: 'HL2:EP1' 850, 'HL2:EP2' 860, and 'HL2:EPy' 870. As another example, the endpoint 2 at hierarchical level 1 880 ('HL1:EP2' 880) is not bound to any other endpoints. As another example, three hierarchical level 3 endpoints are bound to higher level 'HL2:EPy' 870: 'HL3:EP1' 872, 'HL3:EP2' 874, and 'HL3:EPz' 876. As another example, the endpoint 1 at hierarchical level 3 852 ('HL3:EP1' 852) is bound to endpoint 1 at hierarchical level 2 850 ('HL2:EP1' 850). As another example, 'HL1:EPx' 890 is bound to the following endpoints at lower hierarchical level 2: 'HL2: EP1' 892, 'HL2:EP2' 894, 'HL2:EPy' 896.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising that comprises:
  a processor; and
  a memory coupled to the processor, wherein the memory comprises program instructions stored thereon that, upon execution by the processor, cause the IHS to:
    obtain a network binding map that indicates a flat or hierarchical structure of a plurality of endpoints of a network;
    obtain a respective plurality of cryptographic keys for the plurality of endpoints;
    cryptographically sign or encrypt one or more keys of the plurality of cryptographic keys; and distribute the one or more cryptographically signed or encrypted keys of the plurality of cryptographic keys to individual endpoints of the plurality of endpoints based, at least in part, on the network binding map, wherein the plurality of endpoints store a public key of the IHS, and wherein the individual endpoints are configured to use the stored public key of the IHS to cryptographically decrypt or verify a signature of the one or more cryptographically signed or encrypted keys.

2. The IHS of claim 1, wherein to distribute the one or more keys of the plurality of cryptographic keys to the individual endpoints, the program instructions further cause the IHS to:
  distribute, to a first endpoint of the plurality of endpoints, only the one or more keys associated with a respective one or more other endpoints, of the plurality of endpoints, to which the first endpoint is bound, according to the network binding map.

3. The IHS of claim 2, wherein the first endpoint is configured to use the distributed one or more keys to authenticate the respective one or more other endpoints.

4. The IHS of claim 1, wherein to distribute the one or more keys of the plurality of cryptographic keys to the individual endpoints, the program instructions further cause the IHS to:
  distribute, to each endpoint of the plurality of endpoints, only the one or more keys associated with one or more other endpoints, of the plurality of endpoints, to which the respective endpoint is bound, according to the network binding map.

5. The IHS of claim 1, wherein the IHS obtains the respective plurality of cryptographic keys from a public key database.

6. The IHS of claim 5, wherein each of the plurality of endpoints create an individual key pair, that comprises an individual public key, and wherein each of the plurality of endpoints provide their individual public key to the public key database.

7. The IHS of claim 1, wherein the hierarchical structure of the plurality of endpoints of a network is a logical hierarchical structure.

8. The IHS of claim 1, wherein the hierarchical structure of the plurality of endpoints of a network is a physical hierarchical structure.

9. The IHS of claim 1, wherein the plurality of endpoints comprise Radio Units (RUs) and Distributed Units (DUs) of a radio access network (RAN).

10. The IHS of claim 9, wherein the network binding map comprises an RU-DU binding map that at least describes binding among at least some of the RUs and the DUs of the RAN, and wherein to distribute the one or more keys of the plurality of cryptographic keys to the individual endpoints, the program instructions further cause the IHS to:
  determine, based at least in part on the RU-DU binding map, one or more RUs to which a first DU is connected;
  distribute one or more respective keys associated with the one or more RUs to the first DU; and
  distribute a first DU key associated with the first DU to the one or more RUs.

11. The IHS of claim 10, wherein the first DU is configured to use the one or more respective keys associated with the one or more RUs to authenticate the one or more RUs, and wherein each of the one or more RUs is configured to use the first DU key to authenticate the first DU.

12. One or more non-transitory computer-readable storage media which comprise stored program instructions that when executed on or across one or more processors of an Information Handling System (IHS), cause the one or more processors to:

obtain a network binding map that indicates a hierarchical structure of a plurality of Radio Units (RUs) and Distributed Units (DUs) of a radio access network (RAN);

obtain a plurality of cryptographic keys for the respective plurality of RUs and DUs;

distribute one or more RU keys, of the plurality of cryptographic keys, that correspond to one or more of the RUs, to a first DU based, at least in part, on the network binding map; and distribute a first DU key that corresponds to the first DU to the one or more RUs based, at least in part, on the network binding map.

13. The one or more non-transitory computer-readable storage media of claim 12, wherein the one or more RU keys are used by the first DU to authenticate the one or more RUs, and wherein the first DU key is used by each of the one or more RUs to authenticate the first DU.

14. A method, comprising:

obtaining, by a controller of a network, a network binding map indicating a flat or hierarchical structure of a plurality of endpoints of the network, wherein the plurality of endpoints comprise Radio Units (RUs) and Distributed Units (DUs) of a radio access network (RAN);

obtaining, by the controller, a plurality of cryptographic keys for the respective plurality of endpoints; and distributing, by the controller, one or more keys of the plurality of cryptographic keys to individual endpoints of the plurality of endpoints based, at least in part, on the network binding map.

15. The method of claim 14, wherein distributing the one or more keys to the individual endpoints further comprises:

distributing, to a first endpoint of the plurality of endpoints, only the one or more keys associated with a respective one or more other endpoints, of the plurality of endpoints, to which the first endpoint is bound, according to the network binding map.

16. The method of claim 15, wherein the first endpoint is configured to use the distributed one or more keys to authenticate the respective one or more other endpoints.

17. The method of claim 14, wherein the network binding map comprises an RU-DU binding map that at least describes binding among at least some of the RUs and the DUs of the RAN, and wherein distributing the one or more keys to the individual endpoints further comprises:

determining, by the controller and based at least in part on the RU-DU binding map, one or more RUs to which a first DU is connected;

distributing, by the controller, one or more respective keys associated with the one or more RUs to the first DU; and distributing, by the controller, a first DU key associated with the first DU to the one or more RUs.

* * * * *